United States Patent
Gill

(10) Patent No.: US 7,324,312 B2
(45) Date of Patent: Jan. 29, 2008

(54) SENSOR WITH IN-STACK BIAS STRUCTURE PROVIDING EXCHANGE STABILIZATION

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 381 days.

(21) Appl. No.: 10/930,362

(22) Filed: Aug. 30, 2004

(65) Prior Publication Data

US 2006/0044706 A1 Mar. 2, 2006

(51) Int. Cl.
G11B 5/127 (2006.01)
G11B 5/33 (2006.01)

(52) U.S. Cl. .............. 360/324.12; 338/32 R; 324/252

(58) Field of Classification Search ......... 360/324, 360/324.1, 324.11, 324.12, 324.2; 324/252; 338/32 R; 428/811, 811.2
See application file for complete search history.

(56) References Cited

U.S. PATENT DOCUMENTS

| | | | | |
|---|---|---|---|---|
| 6,256,863 B1 | 7/2001 | Saito et al. | ............... | 29/603.08 |
| 6,396,671 B1 | 5/2002 | Horng et al. | ............ | 360/324.1 |
| 6,462,641 B1 | 10/2002 | Dieny et al. | ................... | 338/32 |
| 6,738,236 B1 | 5/2004 | Mao et al. | ............. | 360/324.11 |
| 6,738,237 B2 | 5/2004 | Gill | ....................... | 360/324.11 |
| 6,806,804 B2 * | 10/2004 | Saito et al. | ................. | 336/200 |
| 6,838,740 B2 * | 1/2005 | Huai et al. | ................... | 257/421 |
| 6,937,449 B2 * | 8/2005 | Hoshiya et al. | ........ | 360/324.12 |
| 6,953,601 B2 * | 10/2005 | Li et al. | ...................... | 427/131 |
| 6,980,403 B2 * | 12/2005 | Hasegawa | ................... | 360/319 |
| 7,196,882 B2 * | 3/2007 | Deak | ....................... | 360/324.2 |
| 2001/0018135 A1 * | 8/2001 | Hasegawa et al. | .......... | 428/692 |
| 2002/0191348 A1 * | 12/2002 | Hasegawa et al. | .......... | 360/314 |
| 2003/0072110 A1 | 4/2003 | Dee | ...................... | 360/324.12 |
| 2003/0137780 A1 * | 7/2003 | Fontana et al. | .......... | 360/324.2 |
| 2003/0156361 A1 | 8/2003 | Li et al. | ................. | 360/324.12 |
| 2003/0167625 A1 | 9/2003 | Li et al. | .................. | 29/603.07 |
| 2003/0179517 A1 | 9/2003 | Horng et al. | .......... | 360/324.12 |
| 2003/0193761 A1 | 10/2003 | Cornwell, Jr. et al. | .. | 360/324.12 |
| 2003/0206384 A1 * | 11/2003 | Hoshiya et al. | ........ | 360/324.12 |
| 2004/0008454 A1 | 1/2004 | Gill | ........................ | 360/324.12 |
| 2004/0041679 A1 | 3/2004 | Saito et al. | ................. | 336/200 |
| 2004/0047084 A1 | 3/2004 | Guo | ...................... | 360/324.11 |
| 2004/0057164 A1 * | 3/2004 | Parker et al. | .......... | 360/324.11 |
| 2004/0105191 A1 | 6/2004 | Min et al. | ................. | 360/324.1 |

(Continued)

Primary Examiner—Brian E. Miller
Assistant Examiner—Matthew G. Kayrish
(74) Attorney, Agent, or Firm—Zilka-Kotab, PC

(57) ABSTRACT

A magnetic head having an in-stack bias structure and a free layer structure. The in-stack bias structure includes an antiferromagnetic layer; a first bias layer positioned towards the antiferromagnetic layer, a magnetic moment of the first bias layer being pinned by the antiferromagnetic layer; a first antiparallel coupling layer positioned adjacent the first bias layer; and a second bias layer positioned between the first and second antiparallel coupling layers and having a magnetic moment pinned antiparallel to the magnetic moment of the first bias layer. A second antiparallel coupling layer is positioned adjacent the second bias layer of the bias structure. The free layer structure, positioned adjacent the antiparallel coupling layer, includes a first free layer having a magnetic moment and a second free layer having a magnetic moment pinned antiparallel to the magnetic moment of the first free layer. The second bias layer is antiparallel coupled to the first free layer of the free layer structure for stabilizing the free layer structure.

29 Claims, 9 Drawing Sheets

U.S. PATENT DOCUMENTS

2004/0109264 A1  6/2004  Gill ........................ 360/324.2
2004/0109265 A1  6/2004  Gill ....................... 360/324.12
2004/0169965 A1* 9/2004  Attenborough et al. 360/324.12

* cited by examiner

SENSOR WITH IN-STACK BIAS STRUCTURE PROVIDING EXCHANGE STABILIZATION

FIELD OF THE INVENTION

The present invention relates to magnetic heads, and more particularly, this invention relates to magnetic sensors having an in-stack bias structure providing exchange stabilization.

BACKGROUND OF THE INVENTION

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

In high capacity disk drives, magnetoresistive (MR) read sensors, commonly referred to as MR heads, are the prevailing read sensors because of their capability to read data from a surface of a disk at greater track and linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flow through the MR element. Recorded data can be read from a magnetic medium because the external magnetic field from the recorded magnetic medium (the signal field) causes a change in the direction of magnetization of the MR element, which in turn causes a change in resistance of the MR element and a corresponding change in the sensed current or voltage.

Another type of MR sensor is the giant magnetoresistance (GMR) sensor manifesting the GMR effect. In GMR sensors, the resistance of the GMR sensor varies as a function of the spin-dependent transmission of the conduction electrons between ferromagnetic layers separated by a non-magnetic layer (spacer) and the accompanying spin-dependent scattering which takes place at the interface of the ferromagnetic and non-magnetic layers and within the ferromagnetic layers.

GMR sensors using only two layers of ferromagnetic material (e.g., Ni—Fe) separated by a layer of non-magnetic material (e.g., copper) are generally referred to as spin valve (SV) sensors. In an SV sensor, one of the ferromagnetic layers, referred to as the pinned layer (reference layer), has its magnetization typically pinned by exchange coupling with an antiferromagnetic (e.g., NiO or Fe—Mn) layer. The pinning field generated by the antiferromagnetic layer should be greater than demagnetizing fields (about 200 Oe) at the operating temperature of the SV sensor (about 120° C.) to ensure that the magnetization direction of the pinned layer remains fixed during the application of external fields (e.g., fields from bits recorded on the disk). The magnetization of the other ferromagnetic layer, referred to as the free layer, however, is not fixed and is free to rotate in response to the field from the recorded magnetic medium (the signal field). U.S. Pat. No. 5,206,590 granted to Dieny et al., incorporated herein by reference, discloses a SV sensor operating on the basis of the GMR effect.

An exemplary high performance read head employs a spin valve sensor for sensing the magnetic signal fields from the rotating magnetic disk. FIG. 1 shows a prior art SV sensor 100 comprising a free layer (free ferromagnetic layer) 110 separated from an in-stack biasing layer (pinned ferromagnetic layer) 120 by a non-magnetic, electrically-conducting spacer layer 115. The magnetization of the biasing layer 120 is fixed by an antiferromagnetic (AFM) layer 130. The biasing layer 120 stabilizes the free layer.

FIG. 2 shows another prior art SV sensor 150 with a flux keepered configuration. The SV sensor 150 is substantially identical to the SV sensor 100 shown in FIG. 1 except for the addition of a keeper layer 152 formed of ferromagnetic material separated from the free layer 110 by a non-magnetic spacer layer 154. The keeper layer 152 provides a flux closure path for the magnetic field from the pinned layer 120 resulting in reduced magnetostatic interaction of the pinned layer 120 with the free layer 110. U.S. Pat. No. 5,508,867 granted to Cain et al., incorporated herein by reference, discloses a SV sensor having a flux keepered configuration.

One problem encountered in such structures is that the single ferromagnetic biasing layer 120 must be as thick as the free layer 110 in order to provide sufficient stabilization. However, when a biasing layer 120 of such large thickness is used, the coupling of the AFM 130 to the ferromagnetic biasing layer 120, being inversely proportional to thickness, results in poorly pinned biasing layer 120. The result is a poorly stabilized free layer 120.

What is needed is a way to increase the AFM coupling to an in-stack biasing layer, thereby stabilizing the in-stack biasing layer.

What is also needed is a new in-stack biasing structure that provides good stabilization of the free layer.

SUMMARY OF THE INVENTION

The present invention overcomes the drawbacks and limitations described above by providing a magnetic head. The head includes an in-stack bias structure and a free layer structure. The in-stack bias structure includes an antiferromagnetic layer; a first bias layer positioned towards the antiferromagnetic layer, a magnetic moment of the first bias layer being pinned by the antiferromagnetic layer; a first antiparallel coupling layer positioned adjacent the first bias layer; and a second bias layer positioned between the first and second antiparallel coupling layers and having a magnetic moment pinned antiparallel to the magnetic moment of the first bias layer. A second antiparallel coupling layer is positioned adjacent the second bias layer of the bias structure. The free layer structure, positioned adjacent the antiparallel coupling layer, includes a first free layer having a magnetic moment and a second free layer having a magnetic moment pinned antiparallel to the magnetic moment of the first free layer. The second bias layer is antiparallel coupled to the first free layer of the free layer structure for stabilizing the free layer structure.

In one embodiment, a net magnetic thickness of the first and second bias layers is greater than zero for providing magnetostatic stabilization of the free layer structure in addition to the exchange stabilization provided by the antiparallel coupling of the second bias layer and the first free layer. A preferred net magnetic thickness of the first and second bias layers is less than about 20 Å, the thickness being measured in a direction perpendicular to a plane of the first free layer. The first bias layer preferably has a larger magnetic thickness than the second bias layer.

In a preferred embodiment, a thickness of the second antiparallel coupling layer is greater than a thickness of the first antiparallel coupling layer. A preferred thickness of the second antiparallel coupling layer is about 16 Å to about 20 Å.

In a further embodiment, the second free layer has a larger magnetic thickness than the first free layer.

The head preferably further includes an antiparallel (AP) pinned layer structure positioned towards the free layer structure on an opposite side of the free layer structure relative to the bias structure. The AP pinned layer structure has at least two pinned layers having magnetic moments that are self-pinned antiparallel to each other. The AP pinned layer structure further stabilizes the free layer structure. To further enhance the pinning of the AP pinned layer structure, at least one antiferromagnetic (AFM) layer can be positioned towards the AP pinned layer structure.

The head may also include shield layers positioned above and below the free layer structure. To further reduce the effects of side reading from adjacent tracks, portions of the shield layer positioned outside the track edges can be made to extend downwardly towards the portions of the free layer structure positioned outside the track edges, or alternatively, side shield layers can be positioned on opposite sides of the free layer structure and between the first and second shield layers.

The head described herein may form part of a GMR head, a CPP GMR sensor, a CPP tunnel valve sensor, etc. for use in a magnetic storage system.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
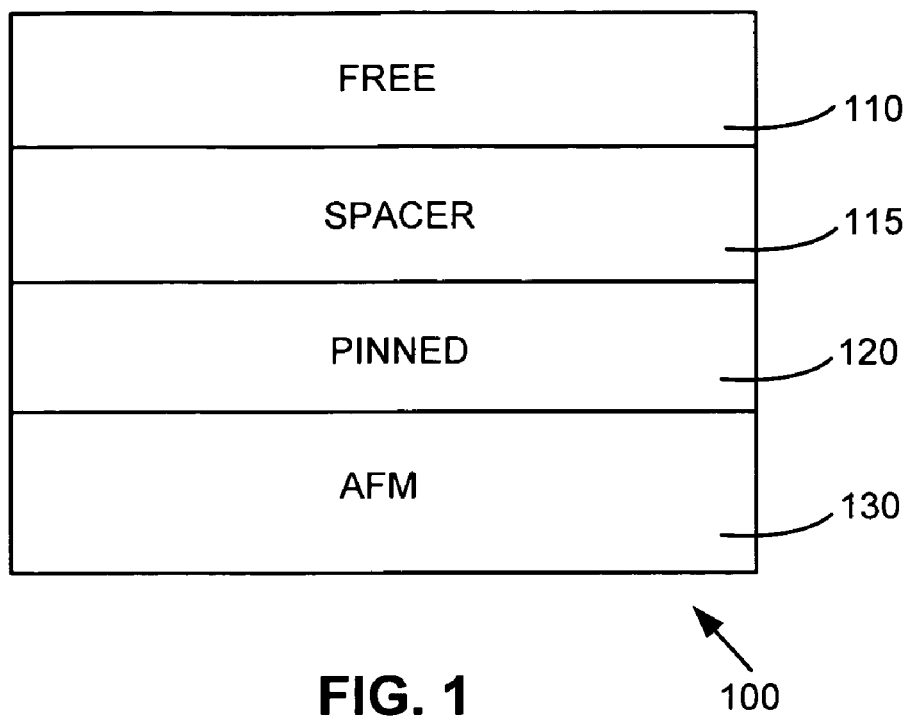
FIG. 1 is an air bearing surface view, not to scale, of a prior art spin valve (SV) sensor.
Figure 2:
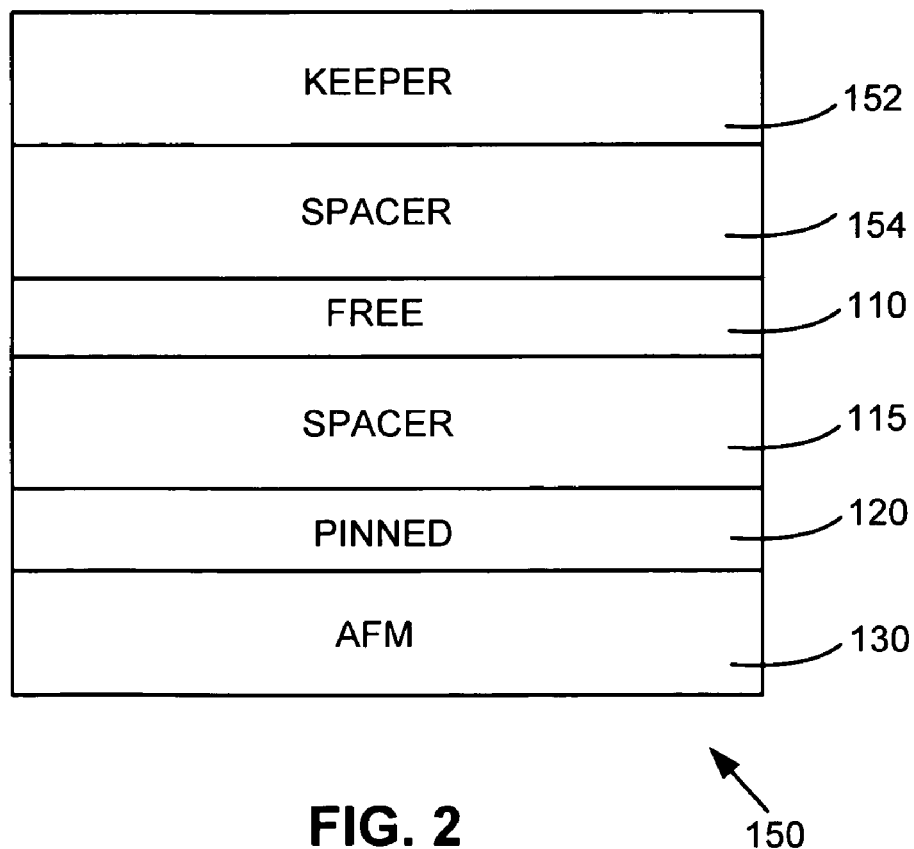
FIG. 2 is an air bearing surface view, not to scale, of a prior art keepered SV sensor.
Figure 3:
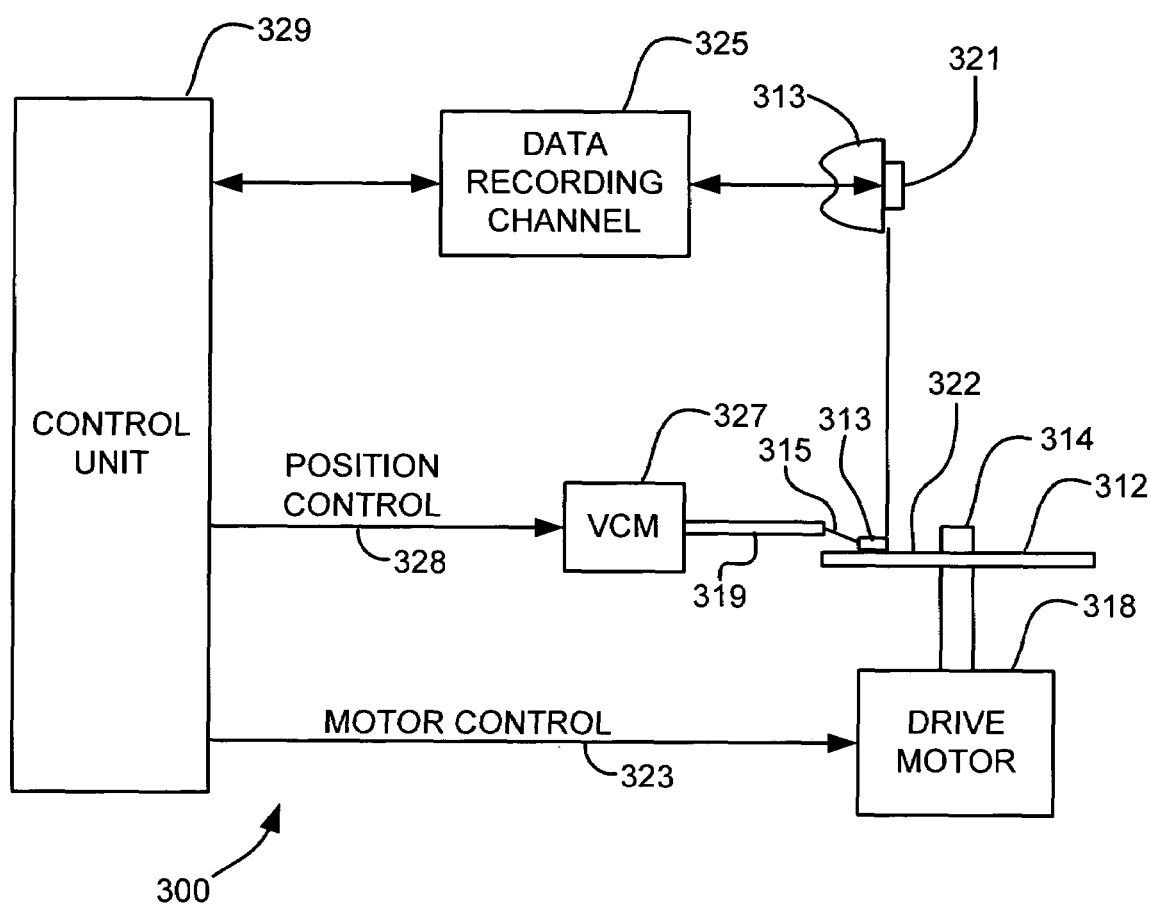
FIG. 3 is a simplified drawing of a magnetic recording disk drive system.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording on each disk is in the form of an annular pattern of concentric data tracks (not shown) on the disk 312.

At least one slider 313 is positioned near the disk 312, each slider 313 supporting one or more magnetic read/write heads 321. As the disks rotate, slider 313 is moved radially in and out over disk surface 322 so that heads 321 may access different tracks of the disk where desired data are recorded. Each slider 313 is attached to an actuator arm 319 by means of a suspension 315. The suspension 315 provides a slight spring force which biases slider 313 against the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

Figure 4:
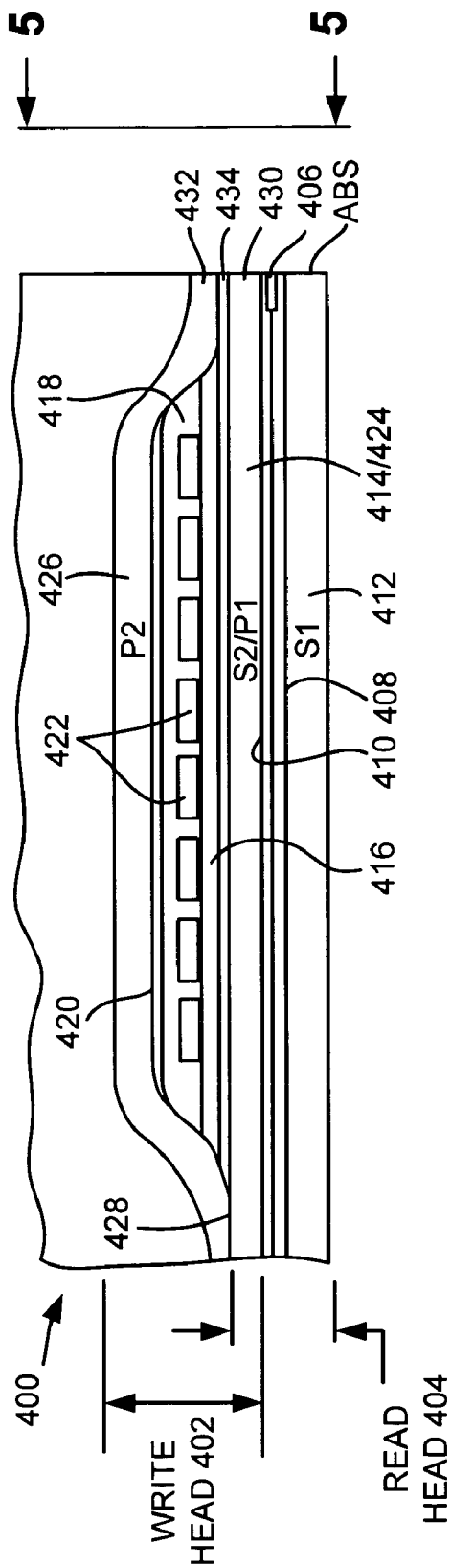
FIG. 4 is a partial view of the slider and a merged magnetic head.
Figure 5:
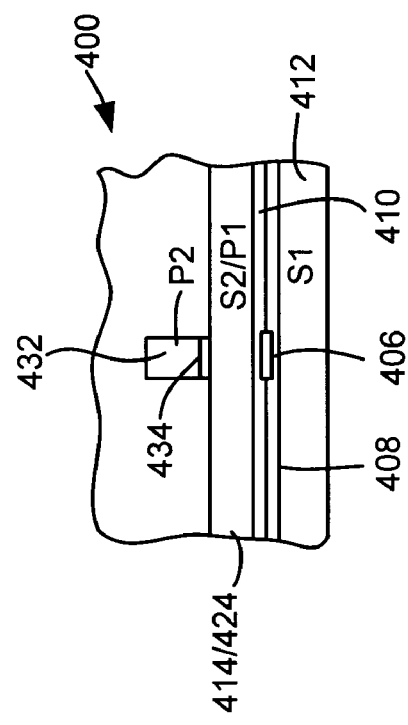
FIG. 5 is a partial ABS view, not to scale, of the slider taken along plane 5-5 of FIG. 4 to show the read and write elements of the merged magnetic head.

FIG. 4 is a side cross-sectional elevation view of a merged magnetic head 400, which includes a write head portion 402 and a read head portion 404, the read head portion employing a dual spin valve sensor 406 of the present invention. FIG. 5 is an ABS view of FIG. 4. The spin valve sensor 406 is sandwiched between nonmagnetic electrically insulative first and second read gap layers 408 and 410, and the read gap layers are sandwiched between ferromagnetic first and second shield layers 412 and 414. In response to external magnetic fields, the resistance of the spin valve sensor 406 changes. A sense current ($I_s$) conducted through the sensor causes these resistance changes to be manifested as potential changes. These potential changes are then processed as readback signals by the processing circuitry 329 shown in FIG. 3.

The write head portion 402 of the magnetic head 400 includes a coil layer 422 sandwiched between first and second insulation layers 416 and 418. A third insulation layer 420 may be employed for planarizing the head to eliminate ripples in the second insulation layer caused by the coil layer 422. The first, second and third insulation layers are referred to in the art as an "insulation stack". The coil layer 422 and the first, second and third insulation layers 416, 418 and 420 are sandwiched between first and second pole piece layers 424 and 426. The first and second pole piece layers 424 and 426 are magnetically coupled at a back gap 428 and have first and second pole tips 430 and 432 which are separated by a write gap layer 434 at the ABS. Since the second shield layer 414 and the first pole piece layer 424 are a common layer this head is known as a merged head. In a piggyback head an insulation layer is located between a second shield layer and a first pole piece layer. First and second solder connections (not shown) connect leads (not shown) from the spin valve sensor 406 to leads (not shown) on the slider 313 (FIG. 3), and third and fourth solder connections (not shown) connect leads (not shown) from the coil 422 to leads (not shown) on the suspension.

Figure 6:
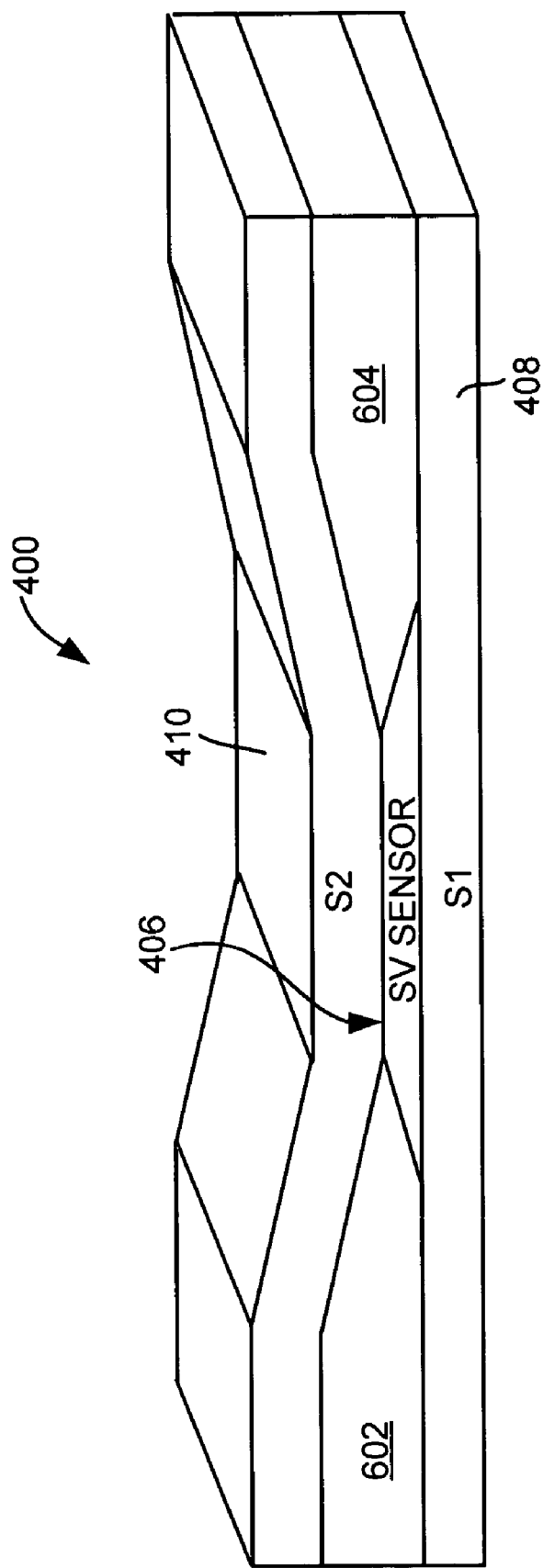
FIG. 6 is an enlarged isometric illustration, not to scale, of the read head with a spin valve sensor.

FIG. 6 is an enlarged isometric ABS illustration of the read head 400 shown in FIG. 4. The read head 400 includes the spin valve sensor 406. Insulating layers 602 and 604 flank the spin valve sensor. The spin valve sensor 406 and the insulating layers 602 and 604 are located between electrically conductive first and second shield layers 408 and 410.

The present invention provides a new sensor structure in which an in-stack bias structure provides both magnetostatic and exchange bias to a free layer structure, thereby providing an additive stabilization scheme. This novel structure has been found to both increase the stability of the free layer structure and improve the stability of the in-stack bias structure. Many types of heads can use the structure described herein, and the structure is particularly adapted to CPP GMR sensors and CPP tunnel valve sensors. In the following description, the track edges of the layers are defined by the track width (W). The sensor height is in a direction into the face of the paper in an ABS view. Unless otherwise described, thicknesses of the individual layers are taken perpendicular to the plane of the associated layer and are provided by way of example only and may be larger and/or smaller than those listed. Similarly, the materials listed herein are provided by way of example only, and one skilled in the art will understand that other materials may be used without straying from the spirit and scope of the present invention. The processes used to form the structures are conventional.

CPP GMR

Figure 7:
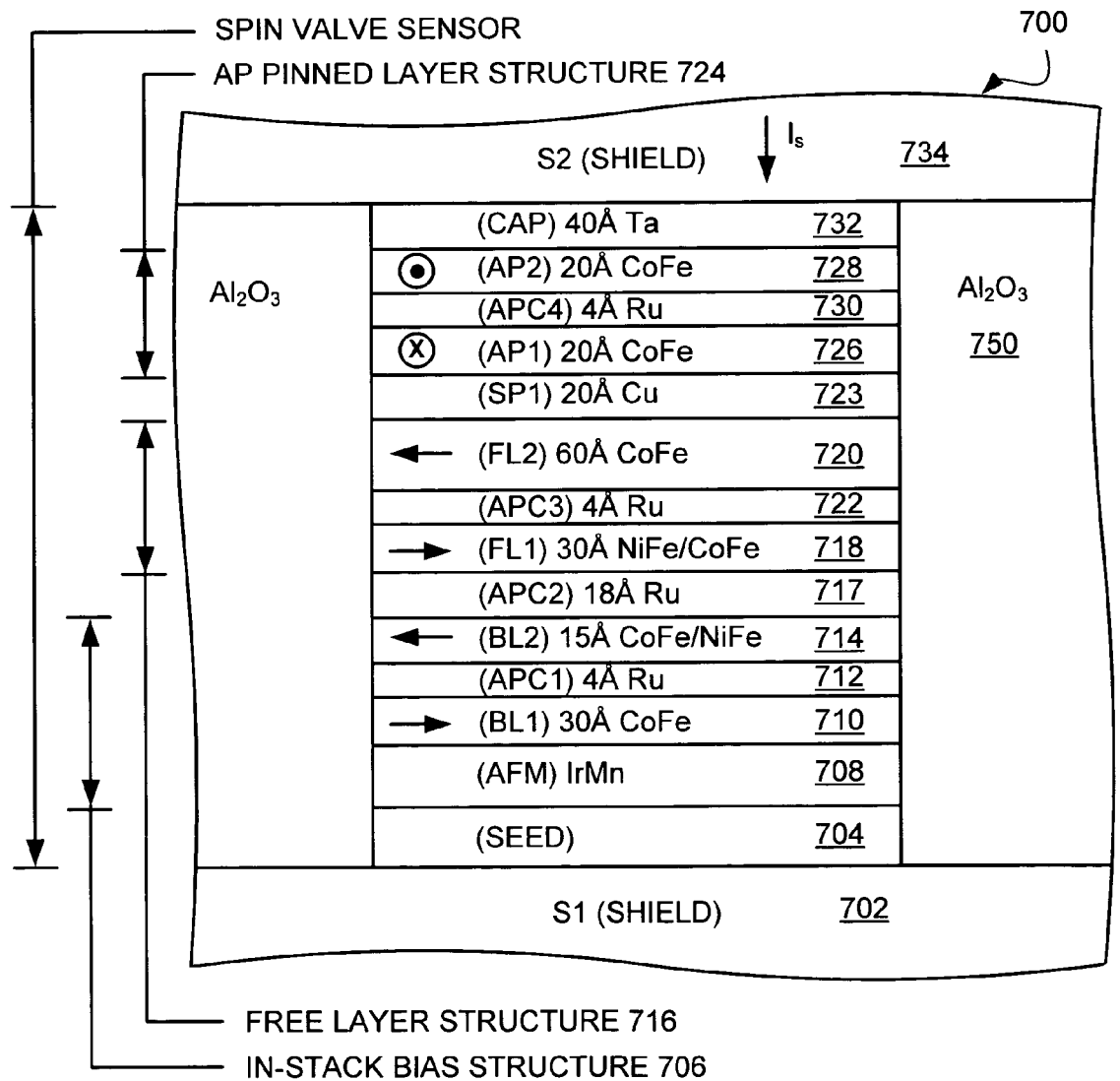
FIG. 7 is an ABS illustration of a CPP GMR sensor, not to scale, according to an embodiment of the present invention.

FIG. 7 depicts an ABS view of a CPP GMR sensor 700 according to one embodiment. "CPP" means that the sensing current ($I_s$) flows from one shield to the other shield in a direction perpendicular to the plane of the layers forming the sensor 700.

As shown in FIG. 7, a first shield layer (S1) 702 is formed on a substrate (not shown). The first shield layer 702 can be of any suitable material, such as permalloy (NiFe). An illustrative thickness of the first shield layer is in the range of about 0.5 to about 2 μm.

Seed layers (SEED) 704 are formed on the first shield layer 702. The seed layers 704 aid in creating the proper growth structure of the layers above them. Illustrative materials formed in a stack from the first shield layer 702 are a layer of Ta and a layer of NiFeCr. Illustrative thicknesses of these materials are Ta (30 Å) and NiFeCr (40 Å). Note that the stack of seed layers 704 can be varied, and layers may be added or omitted based on the desired processing parameters and overall sensor design.

A multilayer in-stack bias structure 706 is formed above the seed layers 704. The in-stack bias structure 706 includes an antiferromagnetic layer (AFM1) 708. A first bias layer (BL1) 710 is formed above the antiferromagnetic layer 708. A first antiparallel (AP) coupling layer (APC1) 712 is formed on the first bias layer 710. A second bias layer (BL2) 714 is formed above the first AP coupling layer 712. This magnetic coupling through the Ru spacer causes the bias layers 710, 714 to have antiparallel-oriented magnetizations are pinned by an IrMn antiferromagnet.

Illustrative materials for the first and second bias layers 710, 714 are NiFe, $CoFe_{10}$ (90% Co, 10% Fe), $CoFe_{50}$ (50% Co, 50% Fe), NiFe/CoFe, etc. Illustrative thicknesses of the first and second bias layers 710, 714 are between about 10 Å and 40 Å. A preferred material for the first AP coupling layer 712 is Ru. An illustrative thickness for the AP coupling layer 712 is between about 4-15 Å, but is preferably selected to provide a saturation field above about 10 KOe. Preferred materials for the AFM layer 708 are PtMn, IrMn, etc. The thickness of the AFM layer 708 can be about 60-150 Å if it is constructed from PtMn, and about 30-80 Å if it is constructed from IrMn.

A free layer structure 716 is formed above the in-stack bias structure 706. The magnetic orientation of the free layer structure 716 must be preset during manufacture, otherwise the orientation will be unstable and could move around at random, resulting in a "scrambled" or noisy signal. This instability is a fundamental property of magnetically soft materials, making them susceptible to any external magnetic perturbations. Thus, the magnetic orientation of the active area of the free layer structure 716 should be stabilized so that when its magnetic orientation moves, it consistently moves around in a systematical manner rather than a random manner. The magnetic orientation of the active portion of the free layer structure 716 should also be stabilized so that it is less susceptible to reorientation, i.e., reversing. The overall structure disclosed herein stabilizes the free layer structure 716.

A second AP coupling layer 717 is formed above the in-stack bias structure. The significance of the second AP coupling layer (APC2) 717 will soon be apparent.

As shown, the free layer structure 716 has first and second magnetic free layers (FL1), (FL2) 718, 720, respectively. The first and second free layers 718, 720 have differing magnetic thicknesses to provide a readable dR/R. Preferably, the second free layer 720 is thicker than the first free layer 718. The edges of the first and second free layers 718, 720 define the track width W and are separated by a thin layer of antiparallel coupling material (APC3) 722. The antiparallel coupling layer 722 causes the magnetic orientations of the first and second free layers 718, 720 in the free layer structure 716 to be oriented antiparallel to each other. The resulting free layer structure 716 can be called a synthetic antiparallel coupled free layer structure.

The free layer structure 716 so can be designed to any desired magnetic thickness. For example, suppose a free layer magnetic thickness of 30 Å (as shown) is desired. The first and second free layers 718, 720 would be 60 Å and 30 Å thick. Because the first and second layers 718, 720 are AP coupled, the net magnetic thickness of the free layer structure 716 is 30 Å. Illustrative materials for the first and second free layers 718, 720 are NiFe, $CoFe_{10}$ (90% Co, 10% Fe), $CoFe_{50}$ (50% Co, 50% Fe), NiFe/CoFe, etc. The AP coupling layer 722 can be about 4-8 Å, and is preferably selected to provide a saturation field above about 10 KOe.

As mentioned above, a typical prior art in-stack bias structure includes an antiferromagnetic (AFM) layer and one ferromagnetic bias layer thereon. That ferromagnetic layer stabilizes the free layer structure. However, the AFM coupling to the ferromagnetic layer is inversely proportional to the thickness of the ferromagnetic layer. The problem is that a single ferromagnetic layer must be as thick as the free layer in order to provide sufficient stabilization. Such large thickness results in a poorly pinned ferromagnetic layer, and consequently, a poorly pinned in stack bias layer. Poor pinning of the ferromagnetic bias layer results in a poorly stabilized free layer.

Thus, in a preferred embodiment, the first bias layer 710 has a magnetic thickness that is greater than the magnetic thickness of the second bias layer 714. By reducing the net magnetic thickness of the in-stack bias structure, the pinning of the first bias layer 710 by the AFM layer 708 is greatly improved over a single bias layer design. The strong pinning of the first bias layer 710 carries over to the second bias layer 714 by AP exchange coupling, thereby providing an in-stack bias structure having greatly improved stability. The improved pinning of the in-stack bias structure results in improved stability of the free layer structure. A preferred net magnetic thickness of the in-stack bias structure 706 is between about 0 and 20 Å, ideally about 10±5 Å. The AP coupling layer 712 is preferably about 4-8 Å thick.

As also described above, instead of using a typical spacer (e.g., Ta) between the in-stack bias structure 706 and free layer structure 716, the present invention implements an AP coupling layer 717 to create a stabilizing AP exchange coupling between the second bias layer 714 of the in-stack bias structure 706 and the first free layer 718. A preferred thickness of the second AP coupling layer 717 is about 16-18 Å. Using an 18 Å thick Ru layer, for example, provides strong AP exchange coupling (several hundred Oe), but not so much as to completely pin the first free layer 718.

Where the first bias layer 710 is larger than second bias layer 714 (thereby providing a net magnetic moment), the in-stack bias layer creates a magnetostatic field that stabilizes the second free layer 720, supplementing the stabilizing effect of the AP exchange coupling between the second bias layer 714 and the first free layer 718. Thus, the stabilizing effects of the magnetostatic and exchange bias are additive, providing overall greater stability to the free layer structure 716.

In the illustrative magnetic head shown in FIG. 7, the free layer demagnetization field is calculated by the following equation:

Free layer demagnetization field=$4\pi M \times (T_{FL}/W)$    Equation 1 where:

M=free layer magnetic moment, $T_{FL}$=free layer net magnetic thickness,

W=track width.

Where $T_{FL}$=30 Å and W=50 nm, the free layer demagnetization field is 600 Oe. The exchange coupling across 18 Å of Ru=300 Oe. To cancel the remaining demagnetization of the free layer structure 716, the net thickness of the bias structure 706 need only be one half the net thickness of the free layer structure 716 to provide the remaining 300 Oe stabilizing field. This is a great improvement over the prior art, where the bias layer thickness needed to be at least equal to the free layer thickness. The net result is that the pinning of the first bias layer 710 by the AFM 708 can be at least twice that of the prior art. Of course, the thicknesses of the various layers will vary depending on the design chosen.

One skilled in the art will also note that for free layers having small net magnetic moments, the AP coupling between the bias structure 706 and the free layer structure 716 may be sufficient. In such a situation, the net moment of bias structure 706 can be reduced towards 0, relying mainly on exchange coupling for stabilizing the free layer structure 716. However, the preferred net moment of the bias structure 706 is 10±5 Å.

With continued reference to FIG. 7, a first spacer layer (SP1) 723 is formed above the free layer structure 716. Illustrative materials for the first spacer layer 723 include Cu, $CuO_x$, $Cu/CoFeO_x/Cu$ stack, etc. The first spacer layer 723 can be about 10-40 Å thick, preferably about 30 Å.

Then an antiparallel (AP) pinned layer structure 724 is formed above the first spacer layer 723. As shown in FIG. 7, first and second AP pinned magnetic layers, (AP1) and (AP2) 726, 728, are separated by a thin layer of an antiparallel coupling material (APC4) 730 such that the magnetic moments of the AP pinned layers 726, 728 are self-pinned antiparallel to each other.

In the embodiment shown in FIG. 7, the preferred magnetic orientation of the pinned layers 726, 728 is for the first pinned layer 726, into the face of the structure depicted (perpendicular to the ABS of the sensor 700), and out of the face for the second pinned layer 728. Illustrative materials for the pinned layers 726, 728 are $CoFe_{10}$ (90% Co, 10% Fe), $CoFe_{50}$ (50% Co, 50% Fe), etc. separated by a Ru layer 730. Illustrative thicknesses of the first and second pinned layers 726, 728 are between about 10 Å and 25 Å. The Ru layer 730 can be about 4-8 Å, but is preferably selected to provide a saturation fields above about 10 KOe. In a preferred embodiment, each of the pinned layers 726, 728 is about 20 Å with an Ru layer 730 therebetween of about 4 Å.

A cap (CAP) 732 is formed above the AP pinned layer structure 724. Exemplary materials for the cap 732 are Ta, Ta/Ru stack, etc. An illustrative thickness of the cap 732 is 20-30 Å.

A second shield layer (S2) 734 is formed above the cap 728. An insulative material 732 such as $Al_2O_3$ is formed on both sides of the sensor stack.

Figure 8:
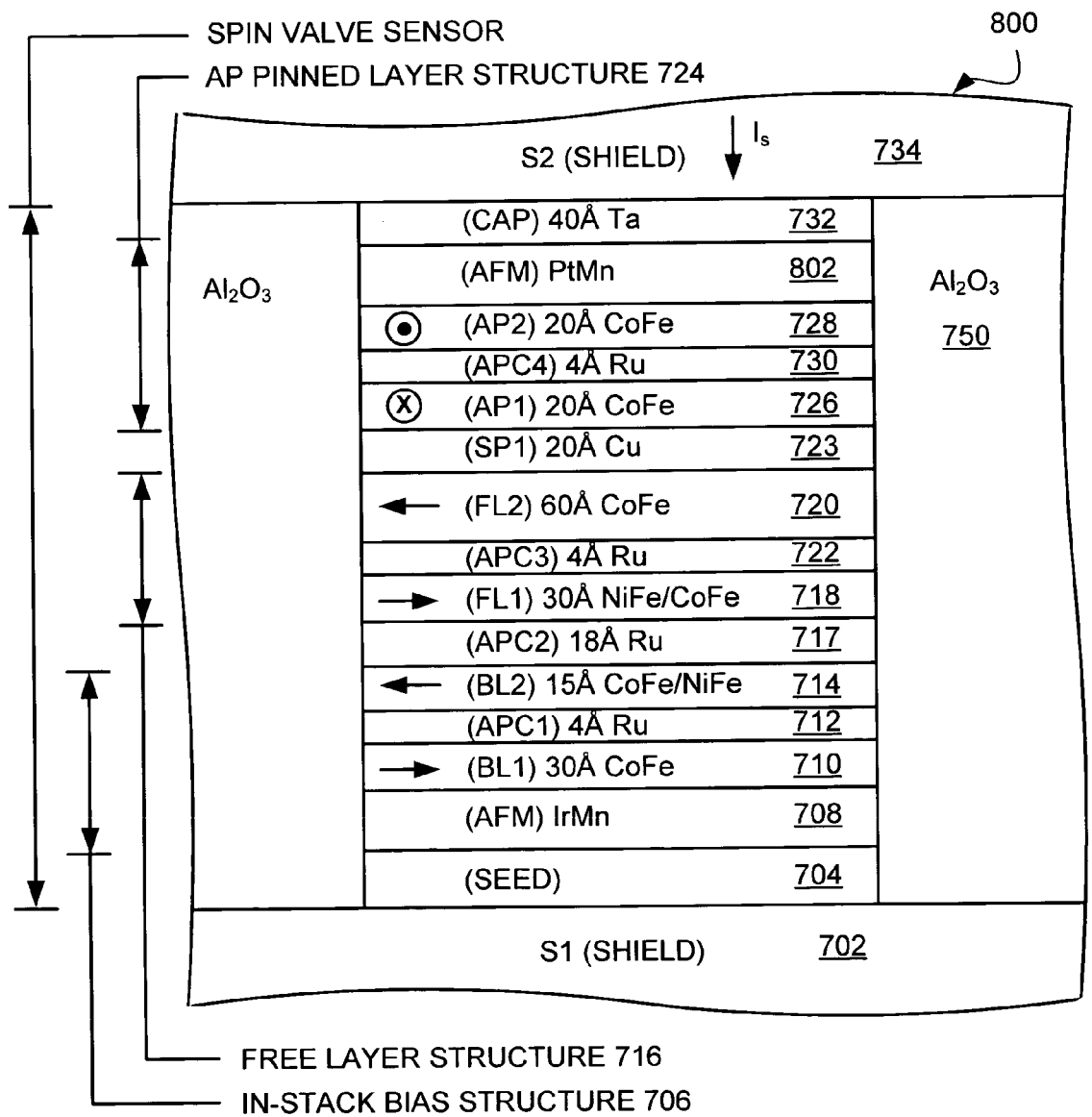
FIG. 8 is an ABS illustration of a CPP GMR sensor, not to scale, according to another embodiment of the present invention.

FIG. 8 depicts an ABS view of a CPP GMR sensor 800 according to another embodiment. The CPP GMR sensor 800 generally has the same configuration as the structure shown in FIG. 7, except that an AFM layer 802 has been added between the AP pinned layer structure 724 and the cap 732. The AFM layer 802 pins the AP pinned layer structure 724.

Note that if there is no upper AFM layer 802 at the top of the sensor stack, the designer has more freedom to select materials for the AFM layer 708 at the bottom of the sensor stack. For instance, PtMn can be used for the lower AFM layer 708 if no upper AFM layer 802 is present. But if PtMn is used for the upper AFM layer 802, and the pinned layers 726, 728 are oriented into and out of page, when a high temperature is used to set the pinned layers 726, 728, a different AFM material is required for the lower AFM layer 708. Accordingly, IrMn can be used to form the lower AFM layer 708 and set the orientations of the bias layers 710, 714 at a lower temp.

Figure 9:
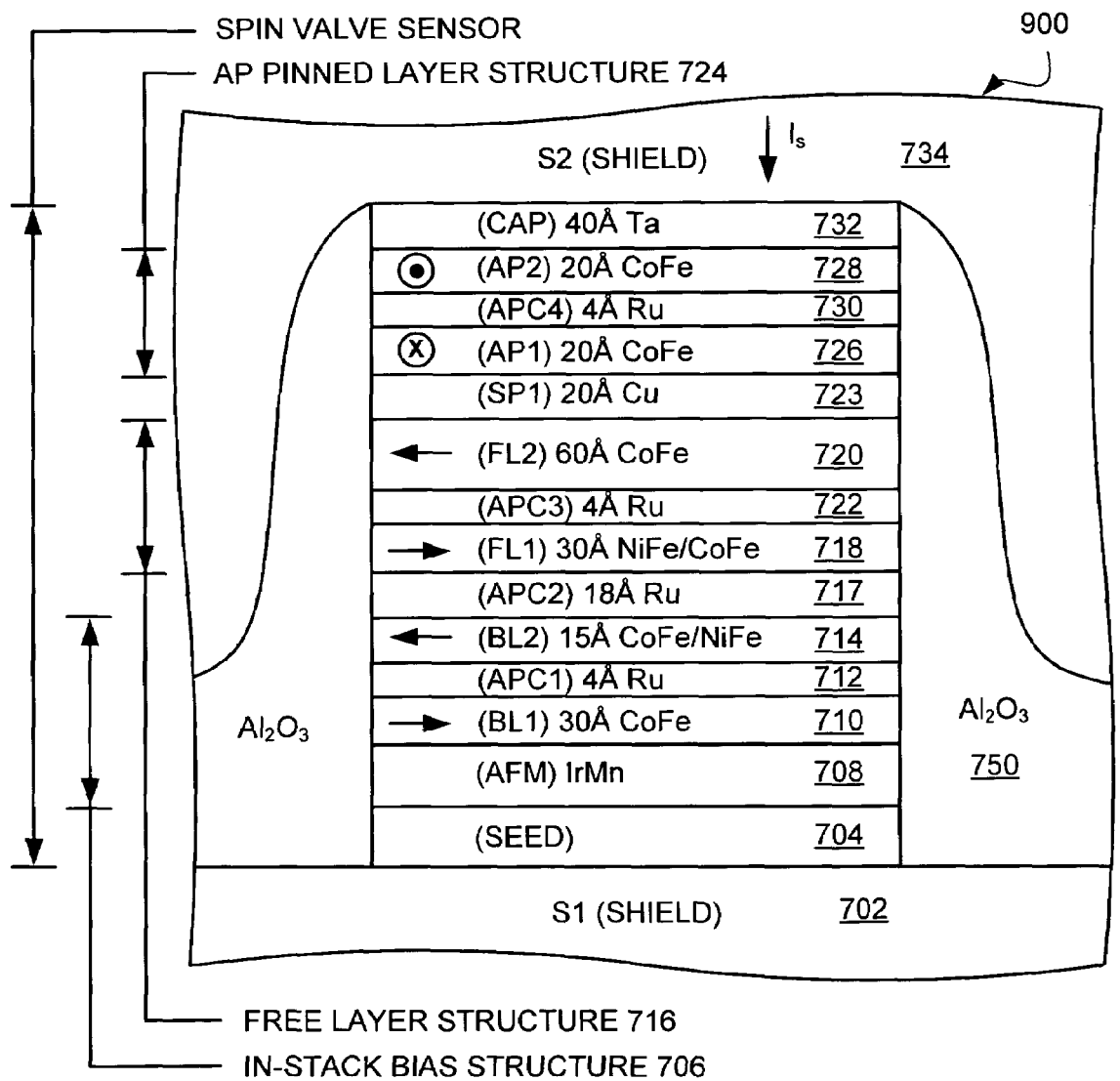
FIG. 9 is an ABS illustration of a CPP GMR sensor, not to scale, according to an alternate embodiment of the present invention.

FIG. 9 depicts an ABS view of a CPP GMR sensor 900 according to another embodiment. The CPP GMR sensor 900 generally has the same configuration as the structure shown in FIG. 7, except that the second shield layer 734 extends downwardly so that it is positioned along a portion of the sensor stack. This design provides better track resolution, because the second shield layer 734 is closer to the free layer structure 716. Magnetic fields from adjacent tracks are drawn to the second shield layer 734, and therefore are less likely to interfere with the reading function.

Figure 10:
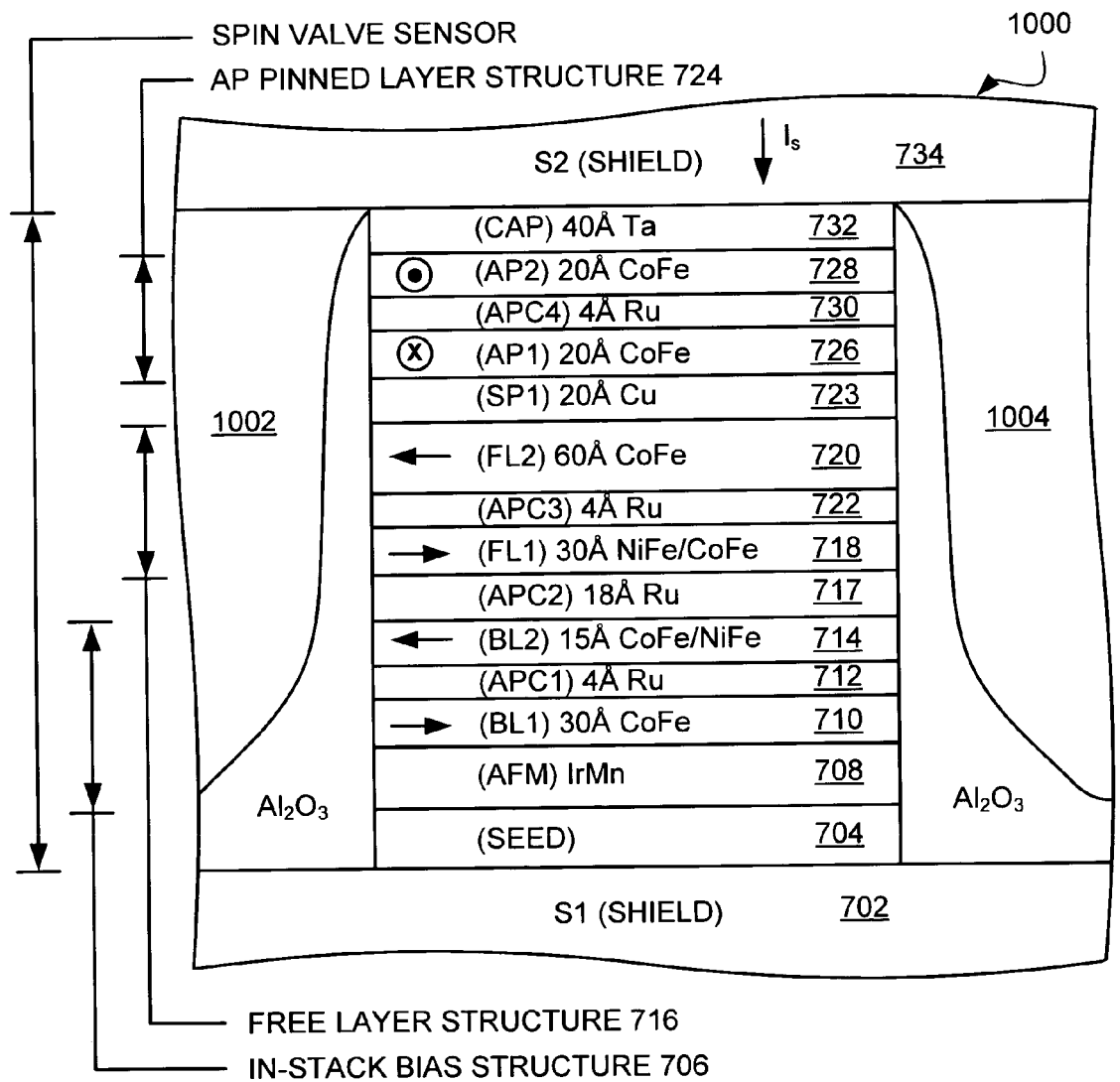
FIG. 10 is an ABS illustration of a CPP GMR sensor, not to scale, according to an yet another alternate embodiment of the present invention.

FIG. 10 depicts an ABS view of a CPP GMR sensor 1000 according to another embodiment. The CPP GMR sensor 1000 generally has the same configuration as the structure shown in FIG. 7, except that side shield layers 1002, 1004 extend downwardly so that they positioned along a portion of the sensor stack. Like the structure shown in FIG. 9, this design provides better track resolution, because the side shield layers 1002, 1004 are closer to the free layer structure 716. Magnetic fields from adjacent tracks are drawn to the side shield layers 1002, 1004, and therefore are less likely to interfere with the reading function.

CPP Tunnel Valve

Figure 11:
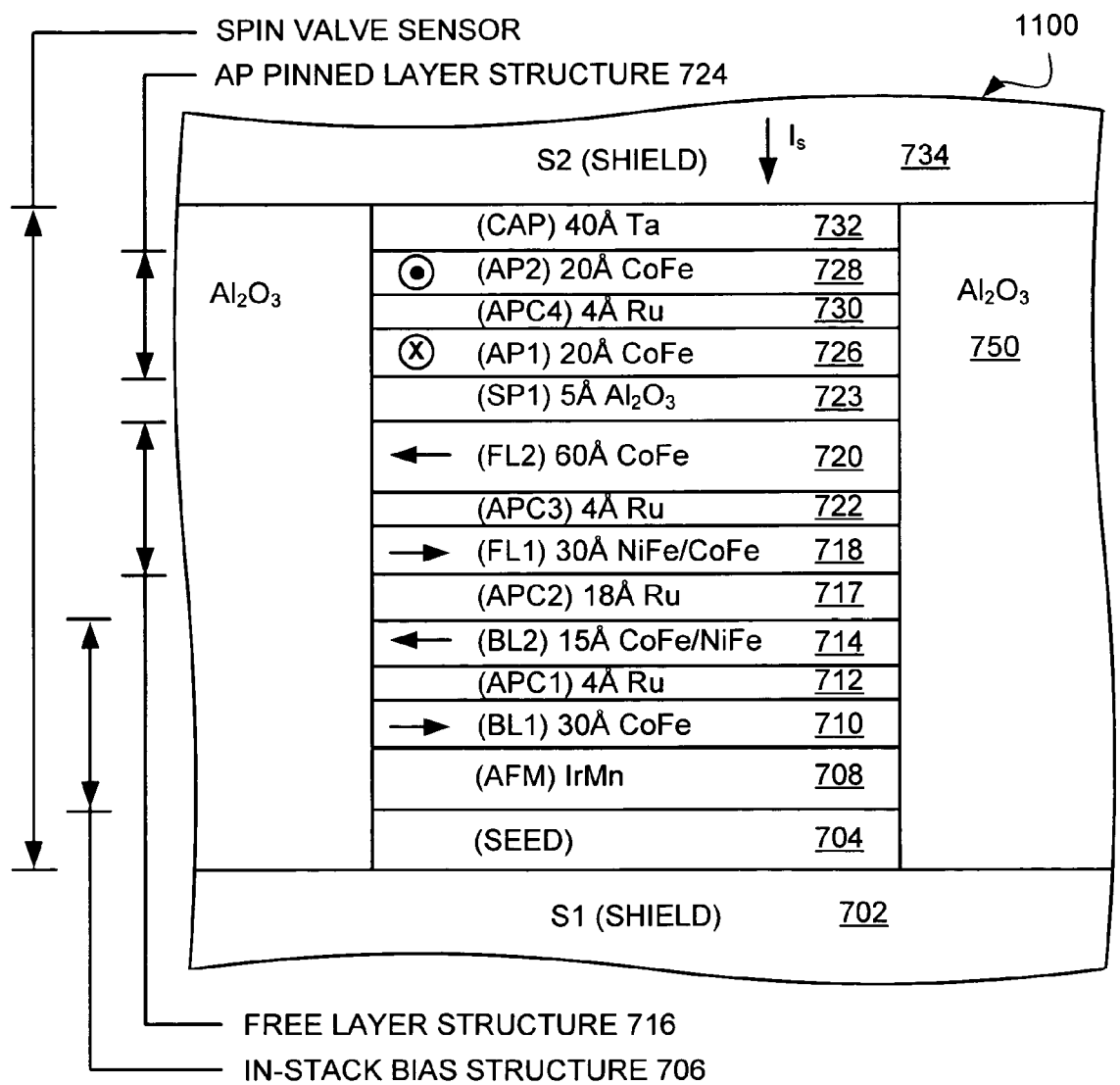
FIG. 11 is an ABS illustration of a CPP tunnel valve sensor, not to scale, according to an embodiment of the present invention.

FIG. 11 depicts an ABS view of a CPP tunnel valve sensor 1100 according to one embodiment. The CPP tunnel valve sensor 1100 generally has the same configuration as the structure shown in FIG. 7, except that the first spacer layer 723 is formed of a dielectric barrier material, such as, $Al_2O_3$, $AlO_x$, $MgO_x$, etc. The first spacer layer 723 is very thin such that the electric current passing through the sensor 1100 "tunnels" through the first spacer layer 723. An illustrative thickness of the first spacer layer 723 is 3-6 Å.

In one method to fabricate the sensors shown in FIGS. 7-11, the layers 702-732 (and optionally AFM layer 802) are formed. A resist mask is formed on the cap layer 732 to cover and define the track width W. The structure is etched or milled down to the seed layers 704 or the first shield layer 702. The structure areas outside the track edges are then filled with $Al_2O_3$ 750 or other electrically insulative material. Side shield layers 1002, 1004 can be added by conventional methods. The structure is planarized via chemical-mechanical polishing (CMP). Then the second shield layer 734 is formed.

Another method to fabricate the sensors shown in FIGS. 7-11 is to form the first shield layer 702 and optionally the seed layers 704. A resist mask is formed outside the desired track edges, leaving the track width W exposed. The remaining layers 708-732 (and optionally layer 802) are formed in the track width W defined between the mask edges. The resist is removed. The structure areas outside the track edges are then filled with $Al_2O_3$ 750 or other electrically insulative material. Side shield layers 1002, 1004 can be added by conventional methods. The structure is planarized via chemical-mechanical polishing (CMP). Then the second shield layer 734 is formed.

While various embodiments have been described above, it should be understood that they have been presented by way of example only, and not limitation. For example, the structures and methodologies presented herein are generic in their application to all MR heads, AMR heads, GMR heads, TMR heads, CPP GMR heads, etc. Thus, the breadth and scope of a preferred embodiment should not be limited by any of the above-described exemplary embodiments, but should be defined only in accordance with the following claims and their equivalents.

What is claimed is:

1. A magnetic head, comprising:
    an in-stack bias structure, comprising
        an antiferromagnetic layer;
        a first bias layer positioned towards the antiferromagnetic layer, a magnetic moment of the first bias layer being pinned by the antiferromagnetic layer;
        a first antiparallel coupling layer positioned adjacent the first bias layer; and
        a second bias layer positioned between the first antiparallel coupling layer and a second antiparallel coupling layer and having a magnetic moment pinned antiparallel to the magnetic moment of the first bias layer;
    the second antiparallel coupling layer positioned adjacent the second bias layer of layer of the bias structure; and
    a free layer structure positioned adjacent the second antiparallel coupling layer, comprising:
        a first free layer having a magnetic moment; and
        a second free layer having a magnetic moment antiparallel coupled to the magnetic moment of the first free layer;
    wherein the second bias layer is antiparallel coupled to the first free layer of the free layer structure for stabilizing the free layer structure.

2. A head as recited in claim 1, wherein a net magnetic thickness of the first and second bias layers is greater than zero for providing magnetostatic stabilization of the free layer structure.

3. A head as recited in claim 2, wherein the net magnetic thickness of the first and second bias layers is less than about 20 Å.

4. A head as recited in claim 1, wherein the first bias layer has a larger magnetic thickness than the second bias layer.

5. A head as recited in claim 1, wherein a thickness of the second antiparallel coupling layer is about 16 Å to about 20 Å.

6. A head as recited in claim 1, wherein a thickness of the second antiparallel coupling layer is greater than a thickness of the first antiparallel coupling layer.

7. A head as recited in claim 1, wherein the second free layer has a larger magnetic thickness than the first free layer.

8. A head as recited in claim 1, further comprising an antiparallel pinned layer structure positioned towards the free layer structure on an opposite side of the free layer structure relative to the bias structure, the antiparallel pinned layer structure having at least two pinned layers having magnetic moments that are self-pinned antiparallel to each other.

9. A head as recited in claim 8, further comprising a second antiferromagnetic layer positioned towards the antiparallel pinned layer structure.

10. A head as recited in claim 1, further comprising a shield layer positioned above the free layer structure, portions of the shield layer positioned outside track edges of the free layer structure extending downwardly, flanking the track edges of the free layer structure.

11. A head as recited in claim 1, further comprising a first shield layer positioned below the in-stack bias structure, a second shield layer positioned above the free layer structure, and side shield layers positioned on opposite sides of the free layer structure and between the first and second shield layers.

12. A head as recited in claim 1, wherein the head forms part of a CPP GMR sensor.

13. A head as recited in claim 1, wherein the head forms part of a tunnel valve sensor.

14. A magnetic head, comprising:
an in-stack bias structure, comprising
an antiferromagnetic layer;
a first bias layer positioned towards the antiferromagnetic layer, a magnetic moment of the first bias layer being pinned by the antiferromagnetic layer;
a first antiparallel coupling layer positioned adjacent the first bias layer; and
a second bias layer positioned between the first antiparallel coupling layer and a second antiparrallel coupling layer and having a magnetic moment pinned antiparallel to the magnetic moment of the first bias layer;
the second antiparallel coupling layer positioned adjacent the second bias layer of the bias structure;
a free layer structure positioned adjacent the second antiparallel coupling layer, comprising:
a first free layer having a magnetic moment; and
a second free layer having a magnetic moment antiparallel coupled to the magnetic moment of the first free layer; and
an antiparallel pinned layer structure positioned towards the free layer structure on an opposite side of the free layer structure relative to the bias structure, the antiparallel pinned layer structure having at least two pinned layers having magnetic moments that are self-pinned antiparallel to each other;
wherein the second bias layer is antiparallel coupled to the first free layer of the free layer structure for stabilizing the free layer structure.

15. A head as recited in claim 14, wherein a net magnetic thickness of the first and second bias layers is greater than zero for providing magnetostatic stabilization of the free layer structure.

16. A head as recited in claim 15, wherein the net magnetic thickness of the first and second bias layers is less than about 20 Å.

17. A head as recited in claim 14, wherein the first bias layer has a larger magnetic thickness than the second bias layer.

18. A head as recited in claim 14, wherein a thickness of the second antiparallel coupling layer is about 16 Å to about 20 Å.

19. A head as recited in claim 14, wherein a thickness of the second antiparallel coupling layer is greater than a thickness of the first antiparallel coupling layer.

20. A head as recited in claim 14, wherein the second free layer has a larger magnetic thickness than the first free layer.

21. A head as recited in claim 14, further comprising a second antiferromagnetic layer positioned towards the antiparallel pinned layer structure.

22. A head as recited in claim 14, further comprising a shield layer positioned above the free layer structure, portions of the shield layer positioned outside track edges of the free layer structure extending downwardly, flanking the track edges of the free layer structure.

23. A head as recited in claim 14, further comprising a first shield layer positioned below the in-stack bias structure, a second shield layer positioned above the free layer structure, and side shield layers positioned on opposite sides of the free layer structure and between the first and second shield layers.

24. A head as recited in claim 14, wherein the head forms part of a CPP GMR sensor.

25. A head as recited in claim 14, wherein the head forms part of a tunnel valve sensor.

26. A magnetic head, comprising:
an in-stack bias structure, comprising
an antiferromagnetic layer;
a first bias layer positioned towards the antiferromagnetic layer, a magnetic moment of the first bias layer being pinned by the antiferromagnetic layer;
a first antiparallel coupling layer positioned adjacent the first bias layer; and
a second bias layer positioned between the first antiparallel coupling layer and a second antiparallel coupling layer and having a magnetic moment pinned antiparallel to the magnetic moment of the first bias layer;
the second antiparallel coupling layer positioned adjacent the second bias layer of the bias structure;
a free layer structure positioned adjacent the second antiparallel coupling layer, comprising:
a first free layer having a magnetic moment; and
a second free layer having a magnetic moment antiparallel coupled to the magnetic moment of the first free layer; and
an antiparallel pinned layer structure positioned towards the free layer structure on an opposite side of the free layer structure relative to the bias structure, the antiparallel pinned layer structure having at least two pinned layers having magnetic moments that are self-pinned antiparallel to each other;
wherein the second bias layer is antiparallel coupled to the first free layer of the free layer structure for stabilizing the free layer structure;
wherein a net magnetic thickness of the first and second bias layers is greater than zero for providing magnetostatic stabilization of the free layer structure.

27. A magnetic storage system, comprising:
magnetic media;
at least one head for reading from and writing to the magnetic media, each head having:
a sensor having the structure recited in claim 1;
a write element coupled to the sensor;
a slider for supporting the head; and
a control unit coupled to the head for controlling operation of the head.

28. A magnetic storage system, comprising:
magnetic media;
at least one head for reading from and writing to the magnetic media, each head having:
a sensor having the structure recited in claim 14;
a write element coupled to the sensor;
a slider for supporting the head; and
a control unit coupled to the head for controlling operation of the head.

29. A magnetic storage system, comprising:
magnetic media;
at least one head for reading from and writing to the magnetic media, each head having:
a sensor having the structure recited in claim 26;
a write element coupled to the sensor;
a slider for supporting the head; and
a control unit coupled to the head for controlling operation of the head.

* * * * *

UNITED STATES PATENT AND TRADEMARK OFFICE
CERTIFICATE OF CORRECTION

PATENT NO. : 7,324,312 B2 Page 1 of 1
APPLICATION NO. : 10/930362
DATED : January 29, 2008
INVENTOR(S) : Hardayal Singh Gill It is certified that error appears in the above-identified patent and that said Letters Patent is hereby corrected as shown below:

In the claims:
col. 10, line 22 change "second bias layer of layer of the bias structure" to --second bias layer of the bias structure--.

Signed and Sealed this

Twenty-seventh Day of May, 2008

JON W. DUDAS
*Director of the United States Patent and Trademark Office*